United States Patent [19]
Conwell et al.

[11] 4,106,848
[45] Aug. 15, 1978

[54] ELASTOMER WAVE GUIDE OPTICAL MODULATORS

[75] Inventors: Esther M. Conwell, Rochester; Dorian Kermisch, Penfield; James C. Maher, Sodus; Gustav R. Pfister; Richard L. Schank, both of Webster, all of N.Y.

[73] Assignee: Xerox Corporation, Stamford, Conn.

[21] Appl. No.: 621,312

[22] Filed: Oct. 10, 1975

[51] Int. Cl.² .................................. G02B 5/14
[52] U.S. Cl. .............................. 350/96.14; 350/96.19; 350/360
[58] Field of Search ................ 350/161, 96 WG, 96 C

[56] References Cited

U.S. PATENT DOCUMENTS

| | | | |
|---|---|---|---|
| 3,625,589 | 12/1971 | Snitzer | 350/96 WG |
| 3,694,055 | 9/1972 | Bergman et al. | 350/96 WG X |
| 3,804,489 | 4/1974 | Li et al. | 350/96 WG X |
| 3,822,928 | 7/1974 | Smolinsky et al. | 350/96 WG |
| 3,838,908 | 10/1974 | Channin | 350/96 WG X |
| 3,856,378 | 12/1974 | Brandt et al. | 350/96 WG |
| 3,871,743 | 3/1975 | Fulenwider | 350/96 WG |
| 3,951,513 | 4/1976 | Masi | 350/96 WG |
| 3,953,620 | 4/1976 | Chandross et al. | 350/96 WG X |

*Primary Examiner*—John K. Corbin
*Assistant Examiner*—John D. Lee

[57] ABSTRACT

Optical modulators and methods of modulating light include introducing light to an optical wave guide from a light source. The wave guide is formed of an elastomer film which is deformable by a mechanical or electrostatic force acting to change the cross section of the film and thereby modulate the light passing through the wave guide.

3 Claims, 7 Drawing Figures

ELASTOMER WAVE GUIDE OPTICAL MODULATORS

BACKGROUND AND SUMMARY OF THE INVENTION

This invention relates to integrated optics and, more particularly, to optical modulators and methods of modulating light.

In integrated optics, thin film technology is employed in optical circuits and devices to achieve more efficient, more economical and minute circuitry. In integrated optic wave guides, modulators and the like, a thin optical wave guide in the form of a light-propagating thin film, which may be only a few microns in thickness, is supported upon a rigid substrate, such as glass. In order to propagate light, the film must have an index of refraction greater than that of the substrate and any other material in contact with the film, such as air. When this condition occurs, the light entering the film will be reflected between the film surfaces and retained in and guided along the film.

It is advantageous to modulate the light propagated through the wave guide film in some aspect, for example intensity, mode, frequency, etc. Such modulation varies some characteristic or property of the light that is discharged from the wave guide film so that it may carry information. Thus, in integrated optics, modulators are valuable in many applications.

Several forms of optical modulators are presently known. In the present optical modulators, the principal effect that produces the modulation is a change in the dielectric properties of the materials in response to electric or magnetic fields or mechanical stresses. Such modulators may employ liquid or solid crystal materials, liquids or gases as light propagating materials. In contrast to prior modulators, the optical modulator and method of the present invention achieves modulation by the physical deformation of the light propagating film directly with a force which is impressed on or across the propagating material. The light propagating material of the present invention is preferably formed of a thin polymeric elastomer film and this film is preferably deformed by an electric field so as to effect a change in the cross section of the thin film. Such changes in cross section result in modulation of the light by scattering or diffracting all or part of the light propagated by the film at the location of the deformation.

In one principal aspect of the present invention, an optical modulator comprises an optical wave guide formed of a deformable material of a given thickness. Deforming means exerts a force on the material to physically deform the deformable material to cause a change in the cross section of the material which cross section change modulates the light by scattering or diffraction at the deformation.

In still another principal aspect of the present invention, an optical wave guide comprises a film of a deformable elastomer or thermoplastic at or near its glass transition temperature which is transparent to the light to be propagated and a rigid substrate supporting the film, which substrate has an index of refraction lower than that of the film.

In still another principal aspect of the present invention, a method of modulating light includes guiding light along an optical wave guide of predetermined cross section and in a direction perpendicular to cross section, and changing the predetermined cross section of the wave guide by impressing a force thereon to physically deform the wave guide to change the predetermined cross section to modulate the light by scattering or diffraction at the deformation.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

Figure 1:
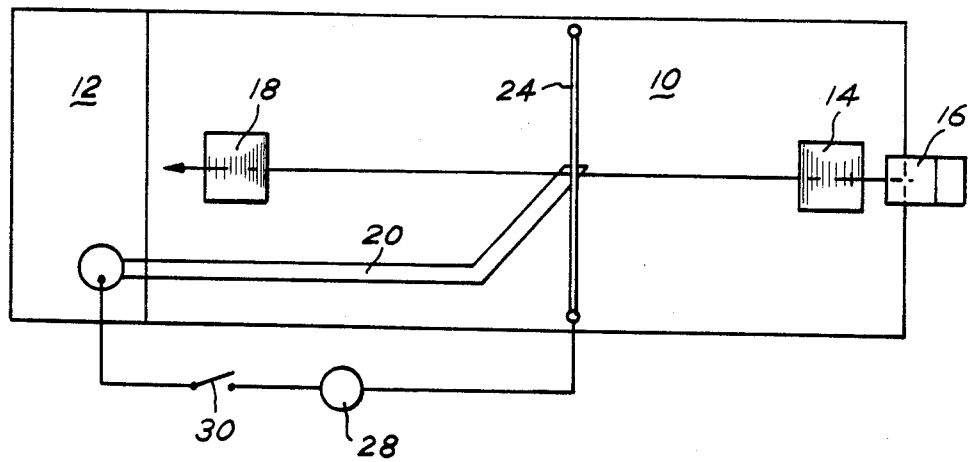
FIG. 1 is a plan view of an optical modulator incorporating the principles of the present invention and which may be employed in practicing the method of the present invention.
Figure 2:
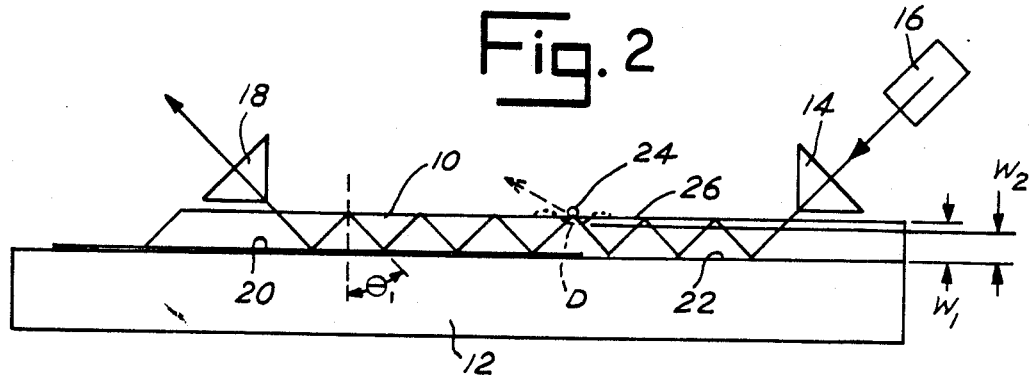
FIG. 2 is an elevation view of the modulator shown in FIG. 1.

Referring to FIGS. 1 and 2, the modulator incorporating the principles of the present invention preferably includes an optical wave guide formed of a thin film 10 of a physically deformable material which is transparent to the light to be propagated and which is coated upon a suitable rigid support substrate 12. The relative thicknesses of the film 10 and substrate 12 as shown in FIG. 2 are not depicted in actual scale. The film 10 is preferably substantially thinner than the substrate 12, but is shown as being relatively thick for illustration purposes only. The thin film 10 is preferably formed of polymeric elastomer which has a greater index of refraction than the support substrate. The elastomer should be one that is capable of being easily deformed when exposed to a force, such as an electric field. A wide variety of elastomers may be selected which meets these requirements. Two such examples include phenylmethyl polysiloxane ($n = 1.54$–$1.55$ at 6328Å) and dimethyl polysiloxane ($n = 1.40$–$1.41$ at 6328Å) crosslinked to the desired elastomeric state. Likewise, a wide variety of substrate 12 materials may be employed. The criteria for selection of such substrate material are that it possesses the requisite mechanical properties, e.g., strength and compatibility with the film 10, and that its index of refraction is substantially lower than that of the film 10. By way of example, a Pyrex microscope glass ($n = 1.513$ at 6328Å) is a suitable substrate where the phenylmethyl polysiloxane film 10 is employed and lithium fluoride ($n = 1.39$ at 6328Å) or sodium fluoride ($n = 1.38$ at 6328Å) may be utilized with films of dimethyl polysiloxane.

Referring again to FIGS. 1 and 2, suitable optical coupling means 14, such as a prism, is positioned to introduce light from one or more coherent light sources 16, to the film 10. A second coupling means 18, such as another prism, is spaced along the film to discharge the light from the film 10. The path of travel of the light source through the film is depicted by the arrow in FIGS. 1 and 2. The light is guided along the film by total reflection at the film surfaces.

In the present invention, the film 10 is preferably of a substantially constant thickness of about 4–10 microns over its length and width. This thickness or cross section is varied by impressing an electric field across the film 10 to modulate the light being propagated through the film. To provide this field, a first electrode 20 is positioned upon the surface 22 of the substrate 12 at the interface between the film 10 and the substrate 12. This electrode 20 may comprise a thin layer of gold of approximately 300A thickness which is sputtered or vacuum evaporated upon the substrate surface 22. A second electrode 24, (or a set of electrodes) preferably formed of a tungsten filament 10–25 microns in diameter, extends transversely across the modulator and overlies the surface 26 of the film and the end of the electrode 20. The electrode may or may not be in contact with the elastomer. A suitable voltage source 28 of about 50–250 V is coupled between the electrodes 20 and 24 and a switch 30 is provided in the circuit to energize the electrodes.

When the switch 30 is open and the electrodes 20 and 24 are deenergized, light will enter the thin elastomer film 10 through coupling prism 14 and will be propagated along the film without interruption by reflection between the substantially parallel surfaces of the film as shown in FIG. 2. The propagated light will be discharged from the film by the output coupling prism 18. When the switch 30 is open and the electrodes 20 and 24 are deenergized, no electric field will be present. Thus, the thickness of the film $W_1$ as shown in FIG. 2, will be substantially uniform over the path of the light. In this condition, the light leaving the film through the coupling prism 18 will be at its maximum intensity.

To modulate the light propagated along the film 10, the electric field across the elastomer layer is modulated. As an illustration, this is done by closing switch 30 shown in FIG. 1 to energize electrodes 20 and 24. The electric field produces an electrostatic force that acts on the electrodes and on any interface where there is a discontinuity in the dielectric permittivity. This force causes a deformation D of the elastomer cross-section along a direction perpendicular to the cross-section, as shown by dotted lines in FIG. 2, to vary the film thickness to $W_2$. The general form of the deformation D, as shown in FIG. 2 for illustrative purposes only, is due to the fact that the elastomer is approximately non-compressible. This change in cross-section causes some or all of the modes of the light propagating through the film to scatter or be diffracted in the region of the deformation. As a consequence, the intensity of the light leaving the film at prism 18 will be substantially diminished. When the voltage drops to zero, either by varying the source or opening the switch 30, the electrodes 20 and 24 will be deenergized and the film will return to its original cross section (thickness $W_1$). Thus, modulation of the light leaving the film at prism 18 may be effected in response to the fluctuations of the applied voltage or to opening and closing of the switch 30.

It will be understood upon consideration of the foregoing description of the invention, that the deformable elastomer film modulator of the present invention may be employed to modulate the intensity of the light, as well as to modulate the light in mode and frequency as well as intensity.

The condition for wave guide modes may be expressed by the formula:

$$2kn_1\cos\theta_1 W - 2\phi_{12} - 2\phi_{10} = 2m\pi$$

where $k$ is constant depending upon the frequency of the light being propagated, $n_1$ is the index of refraction of the wave guide material, $\theta_1$ is the angle of incidence of the light within the film (as shown in FIG. 2), W is the film thickness, $-2\phi_{12}$ and $-2\phi_{10}$ are the phase shifts on total internal reflection, and m is an integer representing the mode order. See P. K. Tien, "Light Waves in Thin Films and Integrated Optics", *Applied Optics*, Vol. 10, No. 11, Nov. 1971, pp. 2395–2413.

From this formula it will be seen that the number of modes that may be propagated at a given frequency is a function of the film thickness W. By way of example, where the film thickness W is approximately 4–10 microns, 4–8 modes will be propagated where the light source 16 is a He-Ne laser which produces a coherent light having a wave length of 6328A. Since the thickness of the film governs the number of modes that may be propagated, it will be seen that mode modulation may be readily effected in the present invention by deformation of the elastomer film 10 by an electric field impressed across the film to reduce its thickness W.

Figure 3:
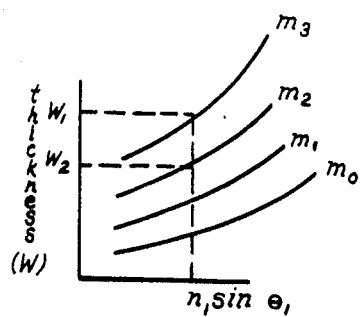
FIG. 3 is a plot of film thickness (W) vs $n_1 \sin \theta_1$ for several modes and showing how mode modulation may be achieved by the modulator and method of the present invention.

Thus, referring to FIG. 3, four modes, $m_0$, $m_1$, $m_2$, and $m_3$ are plotted against thickness W along the y-axis and $n_1\sin\theta_1$ along the axis. It will be seen from FIG. 3 that for a given value of $n_1\sin\theta_1$ and a given thickness $W_1$, all four modes $m_0$–$m_3$ will be propagated through the film. However, when the thickness of the film is reduced to $W_2$ by closing switch 30, the thickness of the thin film will no longer be sufficient to propagate mode $m_3$. Thus, the modulator and method of the present invention are capable of achieving mode modulation of the light.

Referring again to the last mentioned formula, $$k = 2\pi f/c$$

where $f$ is the frequency of the light and $c$ is the speed of light. Where the light being propagated through the film is at several different frequencies, a change in thickness W in the film by deformation of the elastomer may prevent certain frequencies from propagating beyond the point of thickness change.

Although it is believed that the foregoing description of the invention is clearly adequate to enable one skilled in the art to make and use the modulator and practice the method of the invention, the preparation of two suitable phenylmethyl polysiloxane elastomers are set forth by way of example only. Dimethyl polysiloxanes are commercially available. It will be understood that the phenylmethyl and dimethyl polysiloxane elastomers are by no means exhaustive of all elastomers that may be employed in practicing the present invention and are set forth by way of example only. Numerous other elastomers of suitable transparency and mechanical properties may be employed as the light propagating film in the present invention.

EXAMPLE 1

Phenylmethyl polysiloxane cyclics were prepared following the procedure outlined in U.S. Pat. No. 3,546,265:

100 c.c. of isopropyl ether and 75 g. of conc. HCl were charged into a flask. This charge was heated to 50°–55° C and a feed of 191.0 g. of $\phi$MeSiCl$_2$ in 100 c.c. of isopropyl ether was added dropwise to the charge while stirring over 1½ hours.

After addition of the feed was completed, the mixture was stirred for an additional 30 minutes at 50°–55° C and then cooled to 25° C.

This cooled mixture was given a first wash with 150 c.c. of NaCl-H$_2$O and the HCl-H$_2$O bottom layer was siphoned off.

A second and third wash of 150 c.c. of a 2% NaHCO$_3$-H$_2$O were given to a slightly alkaline pH.

Several subsequent washes with 150 c.c. of NaCl-H$_2$O were given to a neutral pH.

The mixture was then filtered and vacuum stripped to remove the isopropyl ether resulting in a yield of 117.0g. of crude product.

This product was vacuum distilled to produce a mixture of ($\phi$MeSiO)$_3$, b.p. about 180° C/2mm and ($\phi$MeSiO)$_4$, b.p. about 237° C/2mm and a total weight of 85.0g.

Phenylmethyl polysiloxane gumstock containing reactive pendant amine crosslinking sites was prepared as follows:

The following was charged into a beaker:
- 8.0g. of the ($\phi$MeSiO)$_x$ cyclics
- 2.0g of (Me$_2$SiO)$_4$ cyclic tetramer
- 0.2g. of ($\Delta$-NH$_2$ Bu MeSiO)$_x$ cyclics
- 100 ppm of tetramethyl ammonium silanolate catalyst.

The beaker was sparged with nitrogen and placed in a 95° C vacuum oven at full vacuum. After 3 hours, the temperature was raised to 150° C for 2 hours to decompose the catalyst and remove fragment molecules. The resulting product was a clear, somewhat sticky gum. This gum was then completely dissolved in benzene at the ratio of 20 wt. % solids to benzene.

2.0g. of the above product solution was mixed with 0.1g. of a crosslinker solution of the acetone oxime adduct of toluene-2,4-diisocyanate (5 wt % in tetrahydrofuran) and coated on a Pyrex glass slide substrate and the solvent evaporated.

The desolvated film was crosslinked (cured) by heating at 60° C for about 30 minutes to form the wave guide.

EXAMPLE 2

Phenylmethyl polysiloxane gumstock containing reactive pendant vinyl crosslinking sites was prepared as follows:

9.9g. of the ($\phi$MeSiO)$_x$ cyclics prepared as set forth in Example 1 were charged into a flask along with 0.1g. of (methylvinyl SiO)$_x$ cyclics. This mixture was heated to 90° C and charged with nitrogen for 15 minutes.

40–45 ppm of the catalyst set forth in Example 1 was added to the flask and heated at 90° C for 3½ hours. This mixture was then heated to 140° C for 2 hours to decompose the catalyst.

The mixture was cooled to room temperature and dissolved in benzene (20 wt. % solids).

0.1g. of benzophenone (a sensitizer for absorbing ultraviolet light) and 0.1g. of tetramethyldisiloxane were added to this mixture. The mixture was coated upon a Pyrex glass slide, desolvated by evaporation, and exposed to 4 w. ultraviolet light for 30 minutes to cure the film to form the wave guide.

In addition to elastomers, other deformable polymers of suitable transparency and mechanical properties may be employed as the light propagating film of the present invention. For example, thermoplastic polymers, such as a 20/80 mole percent copolymer or hexylmethacrylate and styrene, as disclosed in U.s. Pat. No. 3,556,781, may be employed. The property required of thermoplastic polymers to be useful in this application is that they become elastic at their glass transition temperatures, rather than flowing. When such a thermoplastic polymers are employed, the film 10 should be maintained at or near the glass transition temperature of the polymer, such that when the modulating force is exerted on the film, deformation and modulation occurs.

Figure 4:
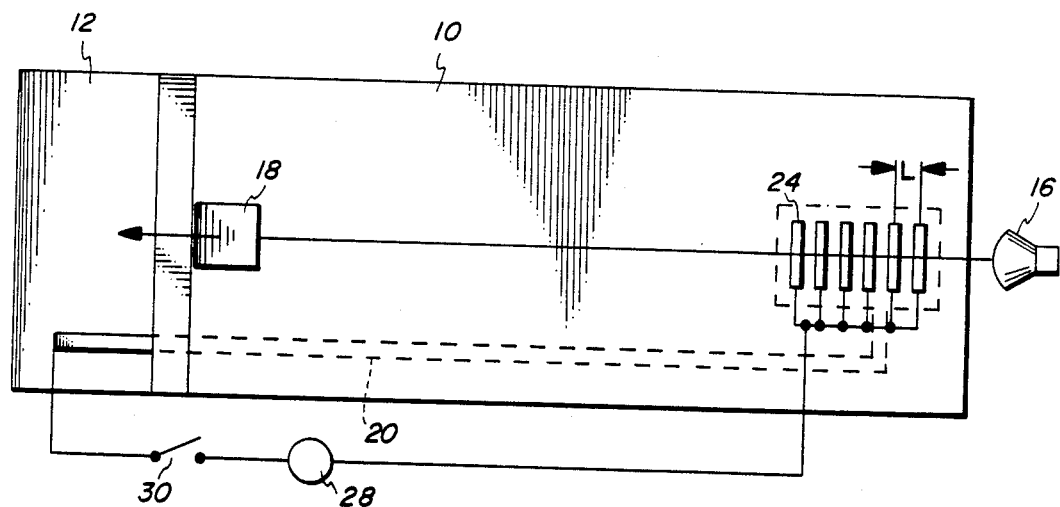
FIG. 4 is a plan view of another embodiment of optical modulator incorporating the principles of the present invention in which modulation is affected at the input coupling.
Figure 5:
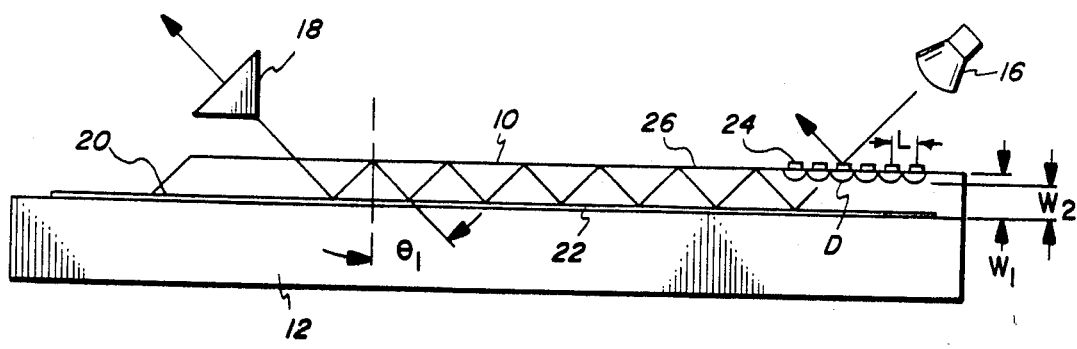
FIG. 5 is an elevation view of the modulator shown in FIG. 4.

Referring to FIGS. 4 and 5, a second embodiment of modulator incorporating the principles of the invention is shown. This modulator is substantially identical to the modulator shown in FIGS. 1 and 2, except that the input optical coupling means has been eliminated and in addition to the electrode 20 a series of electrodes 24, spaced apart by a distance L of the order of the light wavelength ($\sim 0.6\mu$m), has been positioned above the film, in line with the light source 16, to cause modulation of the incoming light. Specifically, the spatially periodic deformation of the film 10, which occurs when the voltage 28 is applied, acts as an optical input grating. Thus, if light from source 16 were incident at the proper angle (determined by the grating spacing) it would enter the film upon deformation. The amount of light entering will depend on the amplitude of the deformation which is controlled by the size of the electric field. Thus, by varying the voltage 28 we can modulate the amount of light coupled into the film.

Figure 6:
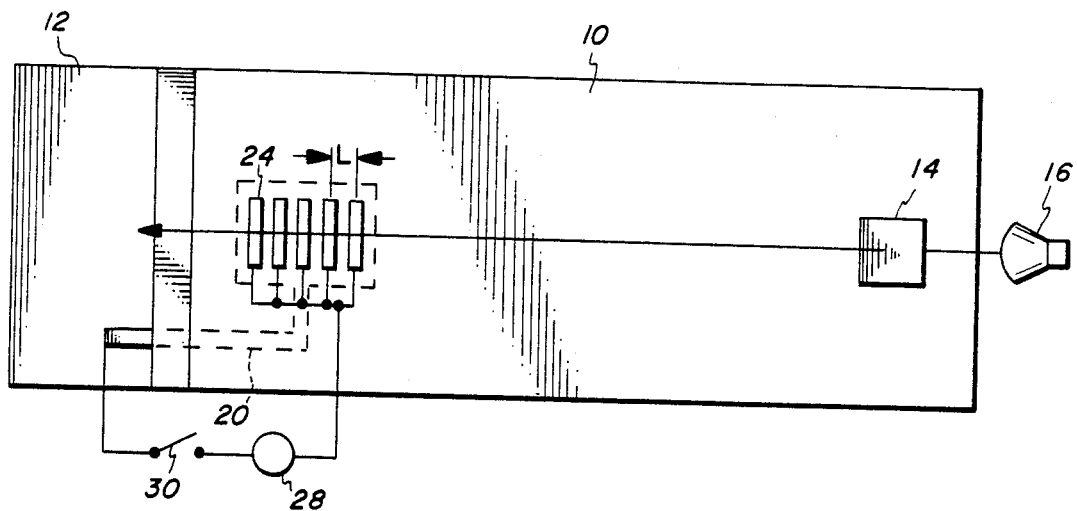
FIG. 6 is a plan view of another embodiment of optical modulator incorporating the principles of the present invention in which modulation is affected at the output coupling.
Figure 7:
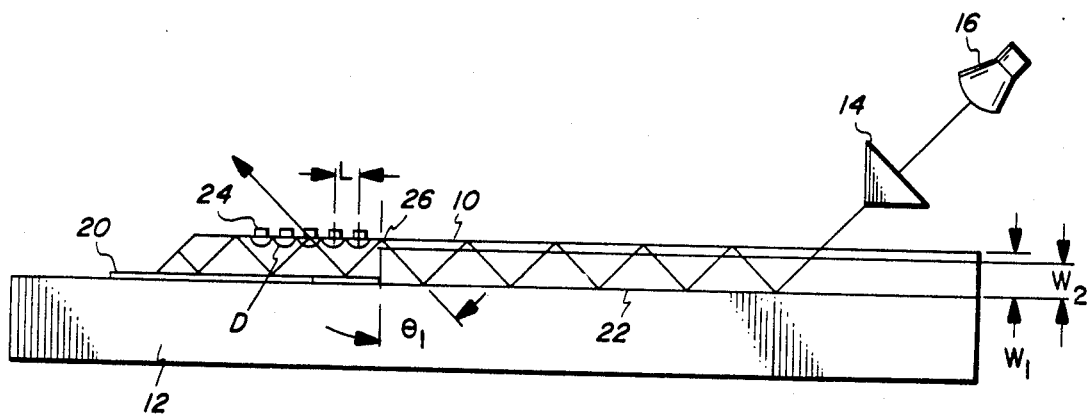
FIG. 7 is an elevation view of the modulator shown in FIG. 6.

Referring to FIGS. 6 and 7, a third embodiment of modulator incorporating the principles of the invention is shown. This modulator is substantially identical to the modulator shown in FIGS. 4 and 5, except that the output optical coupling means has been eliminated and the electrodes 20 and 24 positioned to cause the film to deform to result in an optical output grating to couple light out of the film 10. Thus, if light were being propagated by the film before deformation, that light, or a portion of it, would be coupled out of the film in preferred directions upon the spatial periodic deformation of the film upon energization of the electrodes 20 and 24. The energizing light is modulated and can be used as such.

It will be understood that although the film 10 is shown in the drawings as being of substantial width, it may be narrow, made in the form of a wave guiding channel by means well known to practicioners of the art. The use of such channels is particularly advantageous where smaller deformation and/or deforming forces are desirable.

It will also be understood that the embodiments of the present invention which have been described are merely illustrative of a few of the applications of the principles of the invention. Numerous modifications may be made by those skilled in the art without departing from the true spirit and scope of the invention.

What is claimed is:
1. An optical modulator comprising
   (a) an elastomer waveguide which is comprised of materials selected from the group consisting of thin films of cross-linked dimethyl polysiloxane and cross-linked phenylmethyl polysiloxane, the film being supported by a rigid substrate, the waveguide having a given cross-sectional dimension and being adapted to propagate light; and (b) an electric field means for impressing a field across the waveguide to change its cross-sectional dimension so that light propagating therethrough is modulated.

2. An optical switch for selectively making an elastomer waveguide light coupling, the waveguide being supported on one side by a waveguide support means, the switch comprising:

(a) a first electrode means positioned between the waveguide and the waveguide support means;

(b) an array of parallel electrodes supported by the opposite side of the waveguide, the parallel electrodes being electrically connected, uniformly spaced apart and oriented substantially perpendicular to the direction of propagation of light in the waveguide; and (c) a control means for selectively establishing a field between the first electrode means and the array of electrodes, so that the elastomer waveguide is deformed on the surface supporting the array of electrodes to form a light coupling grating.

3. A method for forming a light coupling grating on an elastomer waveguide having a given cross-sectional dimension, the waveguide being supported on a rigid substrate, the method comprising:

(a) placing the waveguide between a first electrode and an electrode array such that the first electrode is held between the substrate and the waveguide and the electrode array is supported on the opposite side of the waveguide, the electrode array including a plurality of parallel individual electrodes which are electrically connected, substantially evenly spaced apart and positioned substantially perpendicular to the direction of light propagation in the waveguide; and (b) subjecting the waveguide to a field between the first electrode and the electrode array so that the cross-sectional dimension of the waveguide is deformed to form a coupling grating on the surface supporting the electrode array.

* * * * *